Oct. 8, 1935.  O. SIMMEN  2,016,344

TWO-STROKE INTERNAL COMBUSTION ENGINE

Filed May 16, 1933

INVENTOR:
Oscar Simmen

BY
Pennie, Davis, Marvin & Edmonds
ATTORNEY.

Patented Oct. 8, 1935

2,016,344

UNITED STATES PATENT OFFICE

2,016,344

TWO STROKE INTERNAL COMBUSTION ENGINE

Oscar Simmen, Erlach, Switzerland, assignor to the firm of Sulzer Frères Société Anonyme, Winterthur, Switzerland Application May 16, 1933, Serial No. 671,361
In Switzerland February 23, 1933

9 Claims. (Cl. 123—65)

This invention relates to a two-stroke internal combustion engine in which the air is introduced into the engine cylinder through ports.

According to the present invention the air currents flowing towards the ports at an angle to the axis of a port and not sufficiently deflected by the walls alone of that port are divided and deflected by one or more blades mounted in that port.

As opposed to engines in which all the air currents are divided, a construction according to the invention not only ensures perfect direction of the air currents but also results in an increase in the total cross-section of air flow into the cylinder. In addition the necessity for relative inclination of the several air inlet ports is obviated.

When only the central port or ports situated in that part of the cylinder opposite to and more remote from the exhaust ports are subdivided in accordance with the invention it is preferred to arrange each air directing blade so that the air flows through the port in two or more streams separated in the direction of the length of the cylinder. If desired however both the central air inlet port or ports and also the lateral air inlet port or ports more adjacent to the exhaust ports may be furnished with one or more air directing blades, whilst each air inlet port situated between the said central and lateral ports is not furnished with air deflecting blades.

If desired some of the air deflecting blades may be arranged so as to divide the air flow into streams separated in the direction of the length of the cylinder whilst other blades may be arranged so as to divide the air flow into streams separated in the circumferential direction. Thus each air deflecting blade of each central port more remote from the exhaust ports may be so arranged that the air flows through such port in two or more streams separated in the direction of the length of the cylinder, each air deflecting blade of each lateral port more adjacent to the exhaust ports being so arranged that the air flows through this lateral port in two or more streams separated in the circumferential direction. If desired the air directing blades of any one inlet port may be so arranged that the air flows through the said port in streams some of which are separated in the direction of the length of the cylinder and some in a circumferential direction.

One construction according to the invention is illustrated by way of example in the accompanying drawing, in which Figure 1 is a transverse section of a two-stroke internal combustion engine cylinder.

Figure 1:
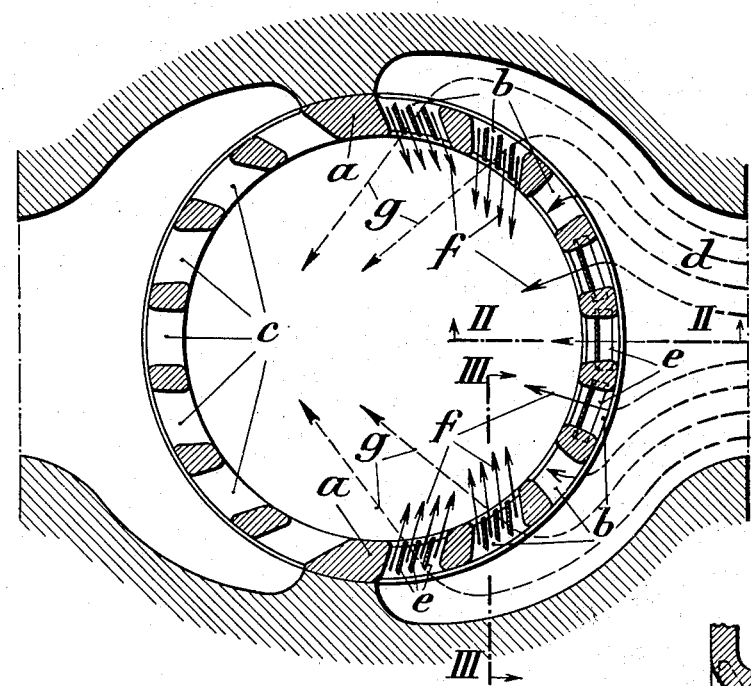
Figure 4:
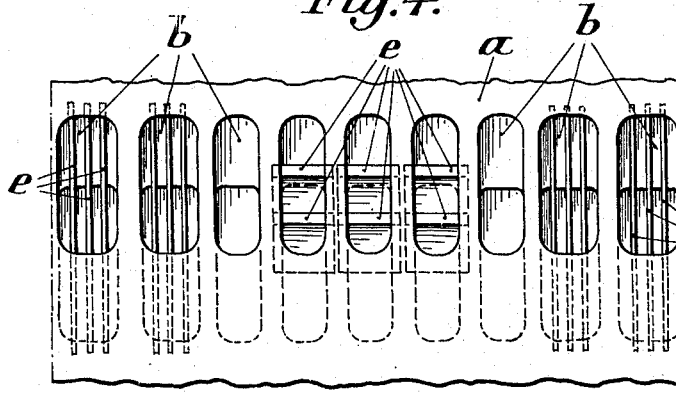
Figure 4 illustrates the right-hand half of the cylinder as shown in Figure 1, opened out into one plane.
Figure 3:
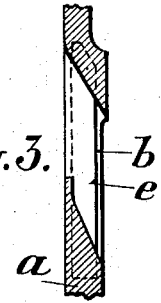
Figure 3 is a section on the line III—III of Figure 1.

In the construction illustrated the cylinder liner $a$ is furnished with air admission ports $b$ and exhaust ports $c$, the air being supplied through an air admission chamber which is bifurcated in plan, as shown in Figure 1. The air entering the central inlet ports, i. e. those situated in that part of the liner opposite to and more remote from the exhaust ports $c$, and the air entering the lateral air inlet ports more adjacent to the exhaust ports $c$ is divided by air directly blades $e$ into separate streams $f$, the blades in each of the central ports being so arranged that the air flows through such port in streams which are separated in the direction of the length of the cylinder that is to say so that these streams are one above the other. The air directing blades in each of the lateral ports more adjacent to the exhaust ports are, however, so arranged that the air flows through such port in several streams separated in a circumferential direction. In such a way that part of the inserted elements deflecting the air into planes parallel or approximately parallel to the cylinder axis is positioned in the inlet ports adjacent the exhaust ports, and that part of the inserted elements deflecting the air into planes oblique to the cylinder axis is positioned in the central inlet ports. The air inlet ports disposed between the said central and lateral ports are not furnished with air directing blades since the walls of these ports will direct the air as desired.

Figure 2:
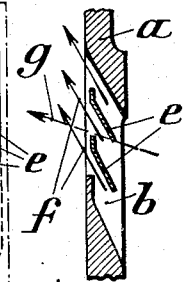
Figure 2 is a section on the line II—II of Figure 1.

If the air directing blades were not provided the air would not be directed as indicated by the arrows $f$ but would flow into the cylinder approximately in the direction of the arrows $g$, that is to say, directly to the exhaust ports. It should also be noted that the position and shape of these directional blades in the case of those inlet ports most remote from the exhaust port, as shown in Figure 2, are such that they direct the air in several directions, first vertically then obliquely to the cylinder axis. As opposed to engines in which all the air currents are divided therefore, the air directing blades according to the invention not only produce perfect direction of the air currents but also result in an increase in the total cross-section of air flow. As compared with engines in which the air currents are not divided, the directing blades according to the invention result in a sufficient cross-section of air flow and better direction of the air.

I claim:

1. In a two-stroke internal combustion engine, the combination of a working cylinder, exhaust ports, inlet ports arranged opposite said exhaust ports, means for deflecting the incoming air through said inlet ports comprising inserted elements positioned within said inlet ports, whereby a part of the inserted elements is such that they deflect the air into planes parallel or approximately parallel to the cylinder axis.

2. In a two-stroke internal combustion engine, the combination of a working cylinder, exhaust ports, inlet ports arranged opposite said exhaust ports, means for deflecting the incoming air through said inlet ports comprising inserted stationary elements positioned within said inlet ports, whereby a part of the inserted elements is such that they deflect the air into planes first vertically, then obliquely to the cylinder axis.

3. In a two-stroke internal combustion engine, the combination of a working cylinder, exhaust ports, inlet ports, means for deflecting the incoming air through said inlet ports comprising inserted elements, whereby one part of the inserted elements is such that they deflect the air into planes parallel or approximately parallel to the cylinder axis, and another part of the inserted elements is such that they deflect the air into planes oblique to the cylinder axis.

4. In a two-stroke internal combustion engine, the combination of a working cylinder, exhaust ports, inlet ports, means for deflecting the incoming air through said inlet ports comprising inserted elements, whereby that part of the inserted elements deflecting the air into planes parallel or approximately parallel to the cylinder axis is positioned in the inlet ports adjacent the exhaust ports, and that part of the inserted elements deflecting the air into planes oblique to the cylinder axis is positioned in the central inlet ports.

5. In a two-stroke internal combustion engine, the combination of a working cylinder, exhaust ports, inlet ports, means for deflecting the incoming air through said inlet ports comprising inserted elements, whereby the air is introduced into the working cylinder through said inlet ports partly in planes parallel or approximately parallel to and partly in planes oblique to the cylinder axis.

6. In a two-stroke internal combustion engine, the combination of a working cylinder, exhaust ports, inlet ports arranged opposite said exhaust ports, means for deflecting the incoming air through said inlet ports comprising inserted elements positioned in the inlet ports adjacent the exhaust port, whereby the air introduced into the working cylinder through these ports is deflected in planes parallel or approximately parallel to the cylinder axis.

7. In a two-stroke internal combustion engine, the combination of a working cylinder, exhaust ports, inlet ports arranged opposite said exhaust ports, means for deflecting the incoming air through said inlet ports comprising inserted elements positioned in the central inlet ports which are the most remote of the inlet ports from said exhaust ports, whereby the air introduced into the working cylinder through these central ports is deflected in planes first vertically, then obliquely to the cylinder axis.

8. In a two-stroke internal combustion engine, the combination of a working cylinder, exhaust ports, inlet ports, means for deflecting the incoming air through said inlet ports comprising inserted elements, whereby the air introduced into the working cylinder through the inlet ports adjacent the exhaust ports is deflected in planes parallel or approximately parallel to the cylinder axis and the air introduced through the central inlet ports is deflected in planes oblique to the cylinder axis.

9. In a two-stroke internal combustion engine, the combination of a working cylinder, an exhaust port, inlet ports, means for deflecting the incoming air through said inlet ports in several directions comprising insertable elements in two of the groups of inlet ports, whereby the air is introduced through the central inlet ports in a plane oblique to the cylinder axis, through the intermediate ports in the direction of the flow of the air and through the inlet ports adjacent the exhaust port in a plane parallel to the cylinder axis.

OSCAR SIMMEN.